Oct. 16, 1951 — R. C. CHURCHMAN — 2,571,419
ELECTRICAL ACTUATION MEANS
Filed March 1, 1946
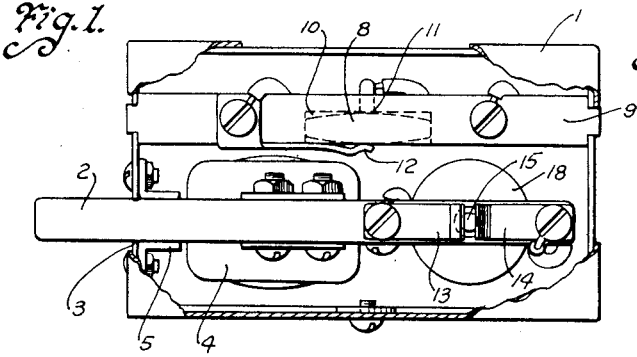
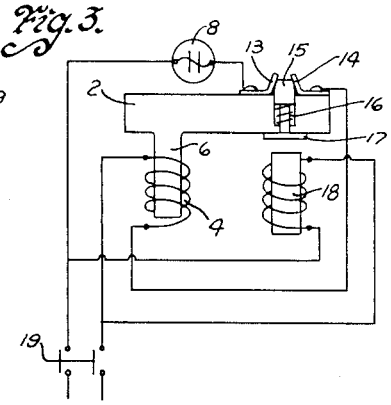
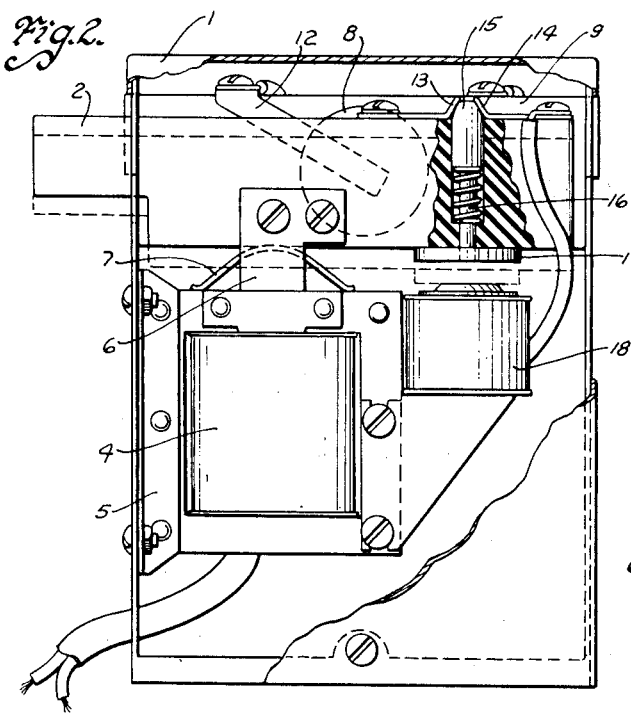
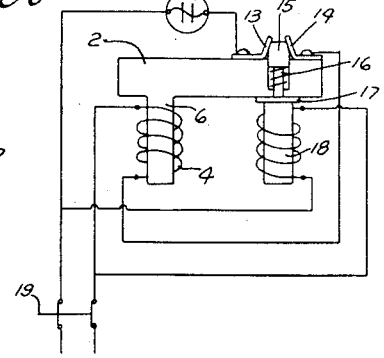
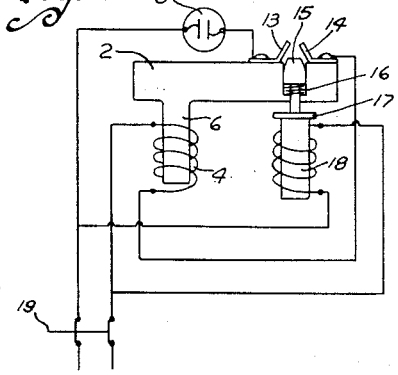
Inventor
Russell C. Churchman
by Harry L. Yinger
Attorney
Witness
Edward P. Seeley Patented Oct. 16, 1951

2,571,419

UNITED STATES PATENT OFFICE 2,571,419

ELECTRICAL ACTUATION MEANS

Russell C. Churchman, Des Moines, Iowa; Nellie Churchman executrix of said Russell C. Churchman, deceased Application March 1, 1946, Serial No. 651,262

1 Claim. (Cl. 200—98)

This invention relates to an electrical actuation device and more particularly to an electrical actuation device employed to actuate intermittently some device such as opening a valve structure and holding the valve open for a predetermined time interval.

Actuation devices that function at intermittent times and for a certain time interval are of course old when associated with clock mechanism. Some actuation devices have been worked out on pressure control structures but all of these prior structures have been very expensive. There has always been a need for an actuating mechanism of low cost which will operate intermittently as desired and function through a definite predetermined time cycle.

It is an object of the present invention among others, to provide an electrical actuation device having means to contact a member to be actuated along with means to make the electrical actuation device function upon the happening of a certain event and to function through a definite predetermined time cycle; an actuation device entirely automatic in operation; an actuation device small and compact, durable and efficient in operation; easy to install and maintain and easy of adjustment; and an actuation device economical to manufacture and operate. Other objects will become apparent from a detailed description to follow in conjunction with the drawing.

In carrying out the objects of the invention there is provided an electrical actuation device mounted in a housing member including an actuation member movable with relation to the housing. There are electrical means for moving the actuation member including an electrically influenced member with a movable member therein with the movable member and the actuation member being movable as a unit. The movable member and the actuation member are pulled to one position when electric current is supplied to the electrically influenced member and means are provided for returning the movable member and actuation member to their original positions when electric current is no longer supplied to the electrically influenced member. The electrically influenced member may be a solenoid with a movable core therein and the means provided for returning the movable member or core is a spring between the electrically influenced member or solenoid and the actuation member, which returns the movable member or core and the actuation member to their original positions. A time control means to close off flow of electric current to the electrically influenced member after a predetermined time interval has elapsed is included which may take the form of a thermostatically controlled switch member. Means for breaking the electrical circuit to the electrically influenced member or solenoid after the thermostatically controlled switch member has closed off flow of electric current to the electrically influenced member or solenoid is provided which includes contact points mounted on the actuation member with means on the actuation member to make and break the electric circuit through the contact points. This means may take the form of a spring pressed pin in the actuation member contacting the contact points to establish an electrical circuit through the contact points. A magnetic coil acts on the pin member to break the electric circuit to the electrically influenced member or solenoid after the thermostatically controlled switch member has closed off flow of electric current to the electrically influenced member or solenoid and a spring forces the pin into contacting relationship with the contact points when electric current no longer flows to the magnetic coil.

With the foregoing and other objects in view, the invention will be more fully described hereinafter and will be particularly pointed out in the claim appended hereto.

In the drawings, wherein like symbols refer to like or corresponding parts throughout the several views:

Figure 1 is a top plan view of the electrical actuation device with a portion of a lid covering the electrical actuation device being broken away to show the interior of the electrical actuation device.

Figure 2 is a side elevational view of the electrical actuation device with a portion of a side wall of the electrical actuation device being broken away to show the interior.

Figure 3 is a diagrammatical view of the position of parts of the electrical actuation device when no electric current flows to the electrical actuation device.

Figure 4 is a diagrammatical view of the position of parts of the electrical actuation device when electric current flows to the electrical actuation device and the actuation member has been pulled downwardly.

Figure 5 is a diagrammatical view of the position of parts of the electrical actuation device with electric current still flowing to the electrical actuation device but the actuation member having returned to its original position.

In the drawing the electrical actuation device is placed in housing member 1 which entirely closes off the mechanism except for actuation member 2 which projects from one side of the housing 1. The housing has a slot 3 to allow for movement up and down of the actuation member 2. In Figure 2 the actuation member is shown in its extreme upward position while the dotted lines indicate its extreme downward position. The actuation member 2 contacts any member desired to be actuated outside housing 1.

An electrically influenced member 4, which may be a solenoid, is mounted to a bracket 5 attached to housing 1. The electrically influenced member, such as a solenoid, is a well known commercial product and applicant lays no claim of novelty to this feature except in the particular combination disclosed. The solenoid 4 has a movable member or core 6 therein which is attached to the actuation member 2 by any suitable manner and in Figure 2 is shown as by screws. It can thus be seen that core 6 and actuation member 2 move as a unit and are pulled to the extreme downward position when electric current is supplied solenoid 4. Core 6 is pulled downwardly when the solenoid 4 is excited in a well known manner for the operation of solenoids. A spring 7 is placed between the actuation member 2 and solenoid 4 which spring has sufficient strength to return actuation member 2 and core 6 to their extreme upward position when solenoid 4 is no longer excited. The solenoid 4 possesses sufficient strength to overcome the strength of spring 7 and move actuation member 2 and core 6 to their extreme downward position.

A thermostatically controlled switch member 8 is mounted on a bar 9 in the housing 1, which bar is parallel to the actuation member 2 and supported by housing 1. The thermostatically controlled switch member 8 may be a heating element of the outlet flash circuit breaker type in the shape of a button and the 60 and 100 watt type have been used most successfully. The member 8 is of the type that when electric current passes therethrough flowing through resistors that are heated, contact members are caused to come together and allow electric current to flow through the thermostatically controlled switch 8. With current flowing through contact members, it no longer flows through the resistors, hence the contact member or members contract and break contact. The time interval the contact members stay together can be regulated by the wattage of resistors in the switch member 8. The thermostatically controlled switch member 8 or flasher can be purchased commercially on the market and its novelty in the present organization resides in its functioning in the combination. The thermostatically controlled switch member 8 fits into a slot 10 in the bar member 9 and is thus easily replaceable in the bar member 9 if smaller or larger wattage flasher members are desired to decrease or increase the time interval the contact members are together. The member 8 fits against a stationary contact point 11 on bar member 9 within slot 10 and spring finger 12 holds member 8 in place within slot 11 and provides the other contact point to feed electric current to the thermostatically controlled member 8.

The actuation member 2, to the right of the solenoid 4, has two contact members 13 and 14 mounted on top the actuation member 2 and in the form of spring fingers. Contact 13 connects electrically with the thermostatically controlled switch member 8 while contact point 14 connects electrically with solenoid 4. A pin 15 is mounted in actuation member 2 and has a spring 16 in actuation member 2 to keep pin 15 pressed into engagement with contacts 13 and 14 and thus establish an electrical circuit between the thermostatically controlled switch 8 and solenoid 4 when electric current flows through member 8. The pin 15 has a head 17 outside actuation member 2 which contacts the underside of actuation member 2 to limit the upward movement of pin 15 and also provide a means to grasp in pulling pin 15 out of contact with contact points 13 and 14.

Means are provided in the form of a magnetic coil 18 for pulling pin 15 downwardly. Magnetic coil 18 is always electrically connected so an electric current flows to the magnetic coil 18 and thus magnetizes the head thereof. When actuation member 2 is pulled downwardly by core 6, head 17 is contacted by the head of magnetic coil 18. When spring 7 returns actuation member 2 to its original upward position, magnetic coil 18 attracts head 17, holding it down, hence pin 15 is pulled out of engagement with contacts 13 and 14 and spring 16 is compressed and will return pin 15 to engagement with contacts 13 and 14 when magnetic coil 18 is no longer energized.

No attempt will be made to trace the electrical hook-up through Figures 1 and 2 but Figures 3, 4 and 5 show the different elements of the organization and their electrical connections. As shown in Figure 3, the electrical actuation means connects electrically with an electrical switch 19 which is shown as open. One side of switch 19 connects to thermostatically controlled switch 8, thence to contact 13 and through pin 15 to contact 14 by a suitable electrical conductor means. From contact 14, a conductor passes to solenoid 4 and from solenoid 4 back to the other side of switch 19. A conductor comes off the conductor line leading to thermostatically controlled switch 8 and leads to magnetic coil 18 and a conductor line leaves magnetic coil 18 and returns to the line from solenoid 4 leading back to the other side of switch 19. When switch 19 is open as in Figure 3 no electric current flows to the electrical actuation device so the parts are in the position shown with the actuation member 2 in its extreme upward position, pin 15 forced into engagement with contacts 13 and 14 and head 17 out of engagement with magnetic coil 18.

Figure 4 shows switch 19 closed and just after thermostatically controlled switch 8 has operated to allow electric current to flow to solenoid 4. Actuation member 2 has been pulled downward, and head 17 contacts magnetic coil 18. In the position of Figure 4 actuation member 2 has opened any device to which it is connected.

In Figure 5, switch 19 is still closed but thermostatically controlled switch 8 is now open and electric current no longer flows to solenoid 4. Spring 7 has forced actuation member 2 upwardly but magnetic coil 18 magnetically attracts head 17 and holds pin 15 down out of engagement with contact points 13 and 14. Electric current cannot again flow to solenoid 4 until the electric circuit through contacts 13 and 14 is again established by switch 19 being opened and spring 16 forcing pin 15 into engagement with contacts 13 and 14.

While the invention has been described in connection with several specific embodiments, it is to be understood that the words which have been used are words of description rather than of limitation and that practice of the invention within the scope of the appended claim may be resorted to without departing from the true scope of the invention in all its aspects.

I claim:

In a device of the class described, a solenoid having a reciprocal core movable in one direction when electrically energized, a yielding means for moving said reciprocal core in the other direction when said solenoid is not electrically energized, an actuation member extending from said reciprocal core, an electromagnet spaced apart from said actuation member, a plunger type electric switch on said actuation member capable of engaging said electromagnet when said reciprocal core and actuation member is moved by the energizing of said solenoid and after contacting said electromagnet of being held in closed position so long as both said solenoid and electromagnet are energized, and being held by said electromagnet in open position when said solenoid is not energized, and regardless of the position of said actuating member thereafter, a yielding means for moving said plunger type switch into a closed position when said actuating member is in an extreme position away from said electromagnet and said electromagnet is not energized; said solenoid and said plunger type switch being imposed in a common circuit, and said electromagnet imposed in a second circuit; said two circuits having a common inlet line and a common outlet line.

RUSSELL C. CHURCHMAN.

REFERENCES CITED

The following references are of record in the file of this patent:

UNITED STATES PATENTS

| Number | Name | Date |
| --- | --- | --- |
| 1,119,660 | Stevens | Dec. 1, 1914 |
| 1,552,235 | Russell | Sept. 1, 1925 |
| 1,568,817 | Falkenwalde | Jan. 5, 1926 |
| 1,826,477 | Olpp | Oct. 6, 1931 |
| 1,952,299 | Van Valkenburg | Mar. 27, 1934 |